(12) United States Patent
Hasegawa et al.

(10) Patent No.: US 8,257,541 B2
(45) Date of Patent: Sep. 4, 2012

(54) MANUFACTURING METHOD AND MANUFACTURING APPARATUS OF ENVELOPE

(75) Inventors: Mitsutoshi Hasegawa, Yokohama (JP); Toshiaki Himeji, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 11/200,071

(22) Filed: Aug. 10, 2005

(65) Prior Publication Data
US 2006/0042748 A1 Mar. 2, 2006

(30) Foreign Application Priority Data
Aug. 24, 2004 (JP) ................ 2004-243622

(51) Int. Cl.
*B32B 37/10* (2006.01)
(52) U.S. Cl. ........ 156/285; 156/286; 264/102; 264/259; 445/25; 445/44; 349/187; 349/191
(58) Field of Classification Search .............. 156/285, 156/87, 583.1, 295, 381, 286; 445/25, 44; 264/102, 259, 272.6
See application file for complete search history.

(56) References Cited

U.S. PATENT DOCUMENTS

| | | | | |
|---|---|---|---|---|
| 3,084,526 A * | 4/1963 | Richardson | ............... | 65/268 |
| 4,973,344 A * | 11/1990 | Rahrig et al. | ............... | 65/288 |
| 6,023,130 A * | 2/2000 | Sakasegawa et al. | ......... | 313/582 |
| 6,254,449 B1 | 7/2001 | Nakanishi et al. | ............... | 445/25 |
| 6,506,089 B2 | 1/2003 | Nakanishi et al. | ............... | 445/25 |
| 6,621,220 B1 | 9/2003 | Hasegawa et al. | ............ | 313/634 |
| 6,827,623 B2 | 12/2004 | Nakatake et al. | ............... | 445/25 |
| 2003/0015963 A1 * | 1/2003 | Tanaka | ........................ | 313/582 |
| 2003/0073372 A1 * | 4/2003 | Nakatake et al. | ............... | 445/25 |
| 2003/0076039 A1 * | 4/2003 | Ookawa et al. | ............... | 313/587 |
| 2005/0103435 A1 | 5/2005 | Tokioka et al. | ............... | 156/292 |

FOREIGN PATENT DOCUMENTS

| | | |
|---|---|---|
| JP | 6-196094 | 7/1994 |
| JP | 2000-82401 | 3/2000 |
| JP | 2001/28241 | 1/2001 |
| JP | 2001-351521 | 12/2001 |
| JP | 2002-260530 | 9/2002 |
| JP | 2003-086099 | 3/2003 |
| JP | 2004-79357 | 3/2004 |

OTHER PUBLICATIONS

Machine Translation of JP 2001-028241.*
Translation JP 2001-028241.*
U.S. Appl. No. 10/724,605, filed Dec. 2, 2003, Masaki Tokioka, et al.

* cited by examiner

*Primary Examiner* — Christopher Schatz
(74) *Attorney, Agent, or Firm* — Fitzpatrick, Cella, Harper & Scinto

(57) ABSTRACT

A method of manufacturing a hermetically sealed container provided with first and second substrates includes the steps of disposing, within a chamber, the first and second substrates opposite to each other to form a gap therebetween, and separating an edge portion of at least the first substrate from the second substrate, for processing to warp the first substrate, within the chamber. Additional steps include exhausting a space between the first and second substrates, by exhausting an inside of the chamber in a state of warping the first substrate, and hermetically connecting the first and second substrates through a bonding material, within the chamber, in a state of exhausting the space between the first and second substrates.

6 Claims, 8 Drawing Sheets

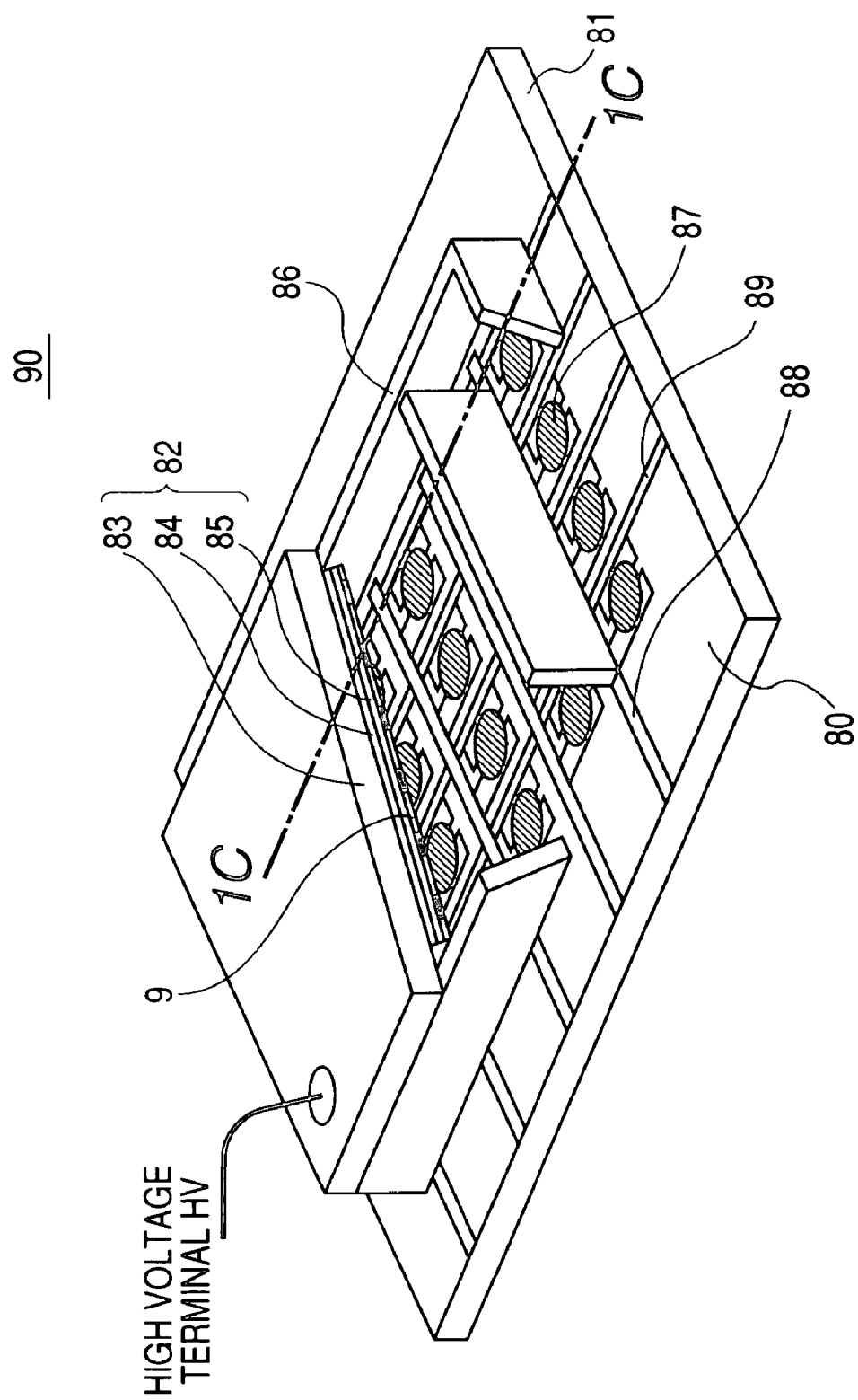

MANUFACTURING METHOD AND MANUFACTURING APPARATUS OF ENVELOPE

BACKGROUND OF THE INVENTION

1. Field of the Invention

The present invention relates to a manufacturing method and a manufacturing apparatus of an envelope of an image displaying apparatus and so on.

2. Related Background Art

Japanese-Patent Application Laid-Open No. S06-196094 discloses a manufacturing method of a vacuum displaying apparatus with a glass container having display surface glass and substrate glass deposited with low melting glass, the method comprising stages of assembling the glass container having low melting point rod glass placed between display glass and the substrate glass, evacuating internal air of the glass container from a gap provided thereon, and melting and seal-bonding the low melting point rod glass in a state of remaining evacuated as-is.

Japanese Patent Application Laid-Open No. 2001-28241 discloses a manufacturing method of an image displaying apparatus of seal-bonding via a joining member a first substrate having phosphor excitation means placed thereon and a second substrate having a phosphor glowing by phosphor excitation means placed thereon, the method comprising a heating process of heating the first and second substrates and joining member up to a sealing temperature in a chamber while holding the first and second substrates between first and second heating means with their sealing portions not in contact and evacuating inside of the chamber, and a seal-bonding process of seal-bonding the first and second substrates via the joining member by bringing their sealing portions into contact in a state of having the inside of the chamber evacuated. According to the manufacturing method disclosed by Japanese Patent Application Laid-Open No. 2001-28241, the evacuation and heating process are performed in the state of holding the two substrates at a desired distance not to bring them into contact.

According to the configuration disclosed by Japanese Patent Application Laid-Open No. 2001-28241, it is necessary, for the sake of holding the first and second substrates without bringing their sealing portions into contact, to fix at least one of the substrates to position adjusting means with a fixture or the like, and move the entire fixed substrate by the position adjusting means in a direction for separating from the other substrate so as to form a gap between the substrates.

In the case of the configuration for moving the entire substrate fixed on the position adjusting means with a fixture or the like in the direction for separating from the other substrate, however, it generates a wasteful clearance (dead stroke) larger than a sufficient clearance for evacuating a space between the substrates. As for such a configuration generating the dead stroke, a manufacturing apparatus becomes more complicated and larger correspondingly and additional traveling time of the substrate is correspondingly required so that reduction in manufacturing time is interrupted.

SUMMARY OF THE INVENTION

Thus, an object of the present invention is to provide a manufacturing method and a manufacturing apparatus of an envelope capable of evacuating a space between substrates without generating a dead stroke between the substrates.

BRIEF DESCRIPTION OF THE DRAWINGS

FIGS. 1A, 1B and 1C are diagrams showing a process flow and an overview configuration of a manufacturing method of an image displaying apparatus according to an embodiment of the present invention;

DETAILED DESCRIPTION OF THE PREFERRED EMBODIMENTS

Figure 1A:
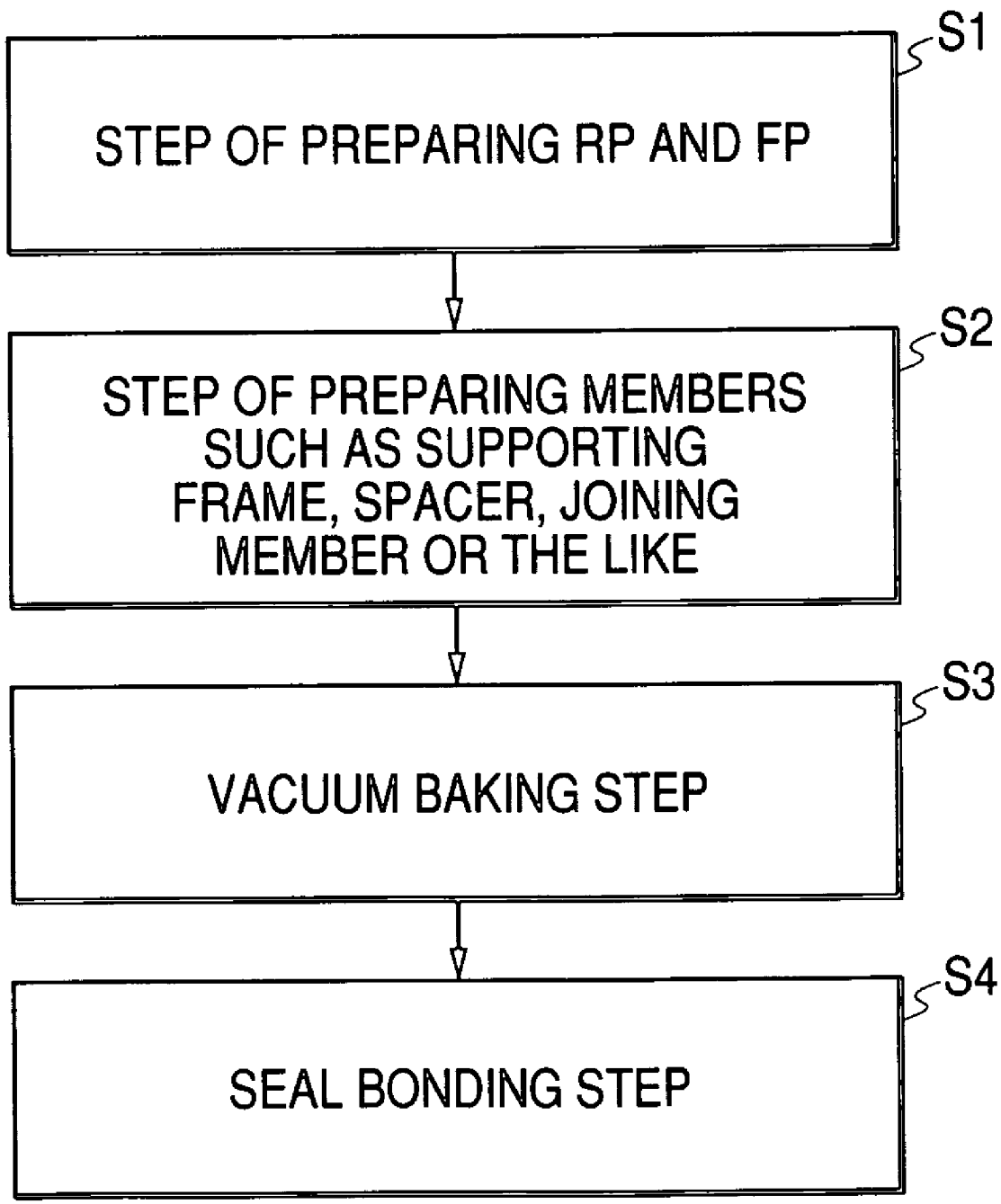

A manufacturing method of an envelope of the present invention is the method of forming a hermetically sealed container by seal-bonding edge portions of a pair of substrates via a supporting frame between them in a depressurized atmosphere comprising a process of warping the edge portions of at least one of the pair of substrates and separating it from the other substrate in the depressurized atmosphere before performing the seal-bonding.

A manufacturing apparatus of the envelope of the present invention is the apparatus for forming a hermetically sealed container by seal-bonding edge portions of a pair of substrates via a supporting frame between them in a depressurized atmosphere comprising separating means for warping the edge portions of at least one of the pair of substrates and separating it from the other substrate.

According to the manufacturing method of the envelope of the present invention, it is possible, just by warping the edge portions of one of the substrates, to generate a gap between the substrates or extend a clearance between them so as to evacuate a space between the substrates through the gap.

According to the manufacturing apparatus of the envelope of the present invention, it is possible, just by warping the edge portions of one of the substrates by the separating means, to generate a gap between the substrates or extend a clearance between them so as to evacuate a space between the substrates through the gap.

As described above, according to the present invention, it is possible to evacuate the space between the substrates without generating a dead stroke between the substrates.

Next, embodiments of the present invention will be described by referring to the drawings.

A manufacturing method and a manufacturing apparatus of an envelope of the present invention include the manufacturing methods and manufacturing apparatuses of a glass container having two sheets of glass bonded together And vacuum-sealed, an image displaying apparatus incorporating electron-emitting devices or an image displaying apparatus such as a plasma display. In particular, the manufacturing method and manufacturing apparatus of the image displaying apparatus are desirable forms of application of the present invention in terms of cost reduction.

The embodiments of the present invention will be described by exemplifying the image displaying apparatus incorporating the electron-emitting device and a phosphor film having electrons emitted by the electron-emitting device irradiated thereon. A concrete description thereof will be given by using FIGS. 1A to 1C, FIGS. 2A to 2C and FIG. 3.

Figure 1C:
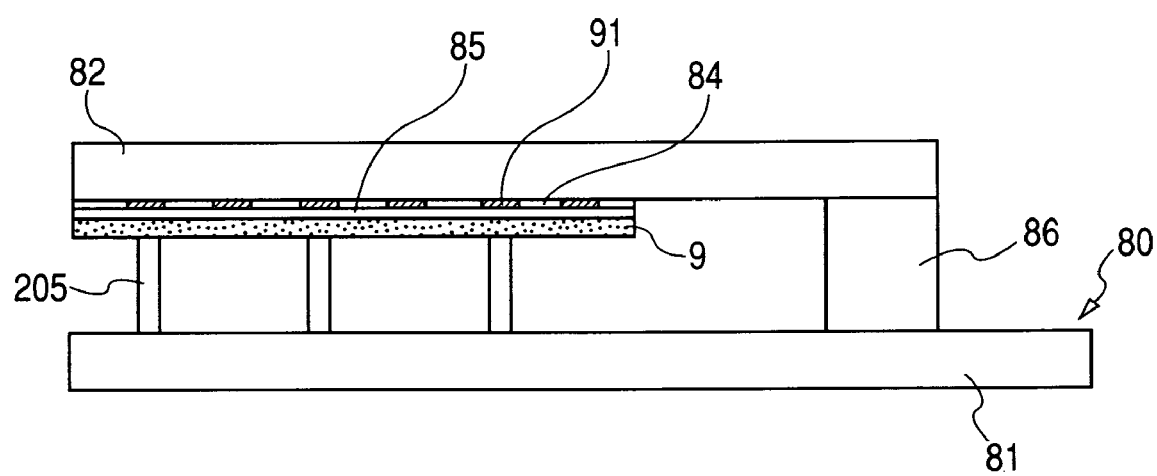

FIGS. 1A to 1C are diagrams showing a process flow and an overview configuration of the manufacturing method of the image displaying apparatus according to an embodiment of the present invention. FIG. 1A is a flow chart showing the process flow of the manufacturing method of the image displaying apparatus according to this embodiment. FIG. 1B is a perspective view showing the overview configuration of the image displaying apparatus according to this embodiment. FIG. 1C is a sectional view at a line 1C to 1C shown in FIG. 1B.

First, the configuration of the image displaying apparatus according to this embodiment will be described by referring to FIGS. 1B and 1C. The image displaying apparatus according to this embodiment is configured by an envelope 90 incorporating a rear plate 81 as a substrate configuring an electron source substrate 80 having multiple electron-emitting devices 87 placed on a top surface thereof and having wirings 88, 89 connected to the electron-emitting devices 87 implemented thereon, a face plate 82 as a substrate having a phosphor film 84, a metal back 85 and a nonvolatile getter 9 configured on a surface opposed to the rear plate 81 of a glass substrate 83, and a supporting frame 86 for oppositely placing the rear plate 81 and face plate 82 with mutually predetermined spacing. Each joining portion of the plates 81, 82 and supporting frame 86 is mutually bonded by using frit glass or In.

According to this embodiment, supports called spacers 205 are placed between the rear plate 81 and the face plate 82. It is thereby possible to configure the envelope 90 strong enough against atmospheric pressure even in the case where the image displaying apparatus is a so-called large-area panel. As for the envelope 90, its size, board thickness of the plates 81, 82 and placement of the spacers 205 are appropriately designed depending on mechanical conditions such as an atmospheric-pressure-resistant structure for the sake of keeping the inside vacuum.

It is general to use a substrate made of a low-cost blue plate glass as the rear plate 81. In that case, however, it is desirable to form a 0.5 μm-thick silicon dioxide film on the substrate as a sodium block layer by a sputter technique. It is also possible to create the rear plate 81 with glass having little sodium component, a quartz substrate or a non-alkali substrate. As for the plasma display, it is possible to use PD-200 (Asahi Glass Co., Ltd.) appropriately as the rear plate 81, which is electric glass having little alkali component.

It is general to use the low-cost blue plate glass as the face plate 82 as with the rear plate 81. However, this embodiment uses PD-200 (Asahi Glass Co., Ltd.) which is the electric glass for the plasma display having little alkali component. This glass material has no glass coloring phenomenon occurring in the case of display use. If the board thickness is 3 mm or so, it has a sufficient shielding effect of suppressing leakage of a soft X-ray generated secondarily even in the case of being driven at an accelerating voltage of 10 kV or more.

It is also general to use the low-cost blue plate glass as the material of the spacers 205. It is selected according to the use of the envelope 90. In the case where position accuracy of the spacers 205 is required, it is desirable to match a thermal expansion coefficient by using the same material as the glass to be bonded together. The spacers 205 should be in a plate-like, column-like, square-column-like or sheet-like form suited to the use, and the number of placements thereof should also be appropriately set up according to the use. In the case of the image displaying apparatus incorporating the electron-emitting devices 87, the spacers 205 are designed to suit an electron orbit.

Figure 2A:
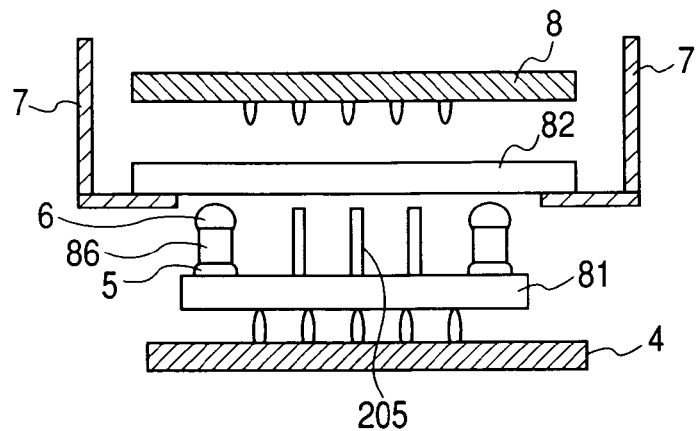
FIGS. 2A, 2B and 2C are diagrams showing stepwise a manufacturing process of an envelope according to an embodiment of the present invention.
Figure 2B:
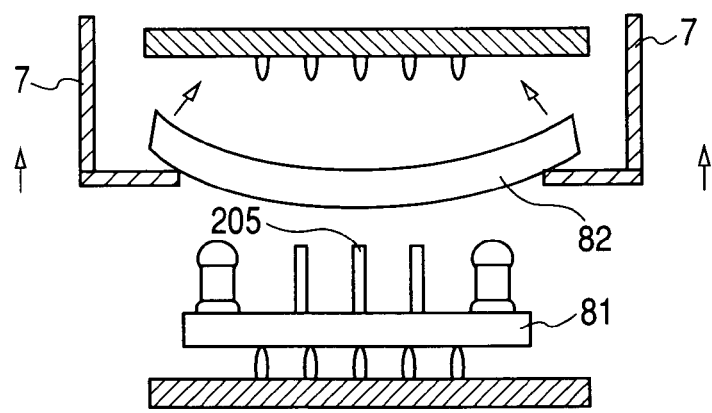
Figure 2C:
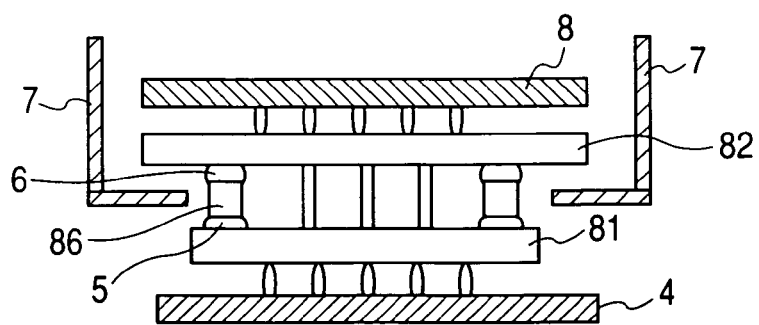

As for joining members 5 and 6 (refer to FIGS. 2A to 2C for joining the plates 81, 82 and supporting frame 86, the frit glass having a comparable thermal expansion coefficient as the plates 81, 82 or a low melting metal such as In, In—Ag or In—Sn is used. Either different materials or the same material may be used for the joining members 5 and 6. It is desirable, by way of example, to use In or In—Ag for, both the joining members 5 and 6.

It is sufficient to have the joining members 5 and 6 applied to at least one of the plates 81, 82 and supporting frame 86. The joining member's 5 and 6 are applied so that total thickness before joining the plates 81, 82 and supporting frame 86 becomes sufficiently more than that after joining them. According to this embodiment, they are applied so that the thickness of an In film formed by the joining members 5 and 6 after joining becomes 300 μm.

The face plate 82 has the phosphor film 84, metal back 85 and nonvolatile getter 9 formed on the surface opposed to the rear plate 81 of the glass substrate 83 so that this portion becomes an image display area. The position for placing the nonvolatile getter 9 on the face plate 82 is on a black conductive body 91 between the metal back 85 and the phosphor film 84 of the face plate 82. It is desirable to place the nonvolatile getter 9 evenly all over the image display area.

It is possible to form the nonvolatile getter 9 on the face plate 82 by using a material of which major component is Ti by a vacuum deposition method such as an electron beam or a sputter. According to this embodiment, film thickness of the nonvolatile getter 9 is 800 Å (80 nm). However, the placement position and film thickness of the nonvolatile getter 9 are not limited to the above but may be appropriately designed and set up.

Figure 3:
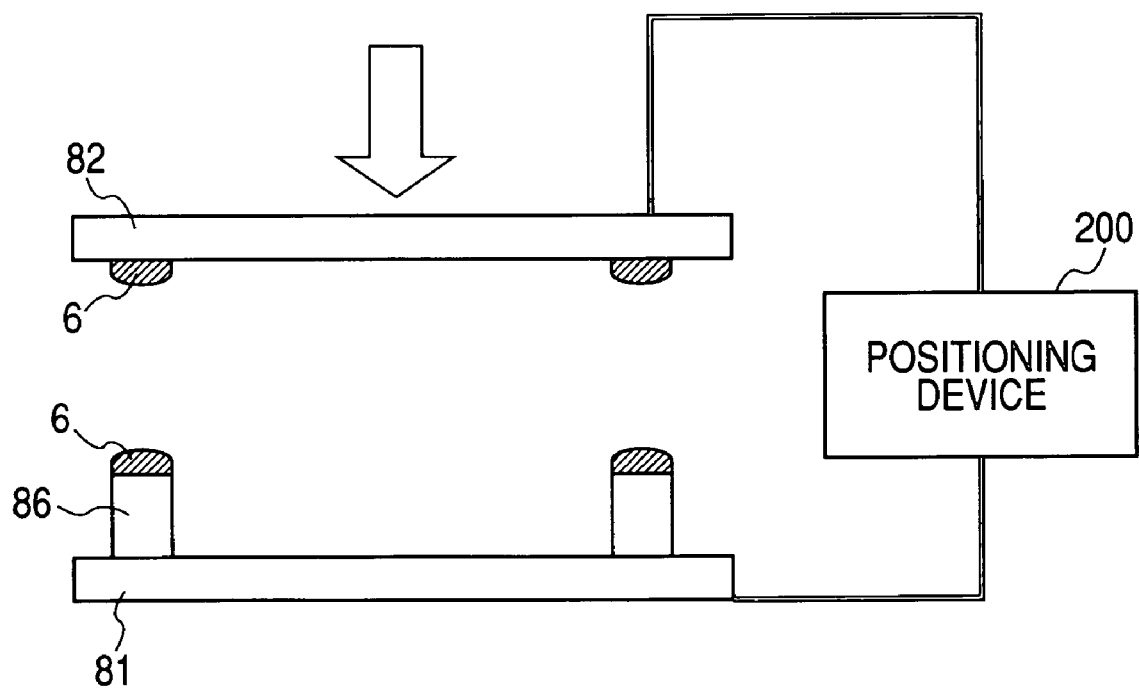
FIG. 3 is a diagram showing a process of positioning a rear plate and a face plate.

Next, a manufacturing process of the envelope according to this embodiment will be described by referring to FIG. 1A, FIGS. 2A to 2C, and FIG. 3. FIGS. 2A to 2C are diagrams showing stepwise the manufacturing process of the envelope according to this embodiment, and FIG. 3 is a diagram showing the process of positioning the rear plate and the face plate.

First, the rear plate (RP) 81 and the face plate (FP) 82 are prepared (step 1).

Next, as shown in FIG. 2A, the rear plate 81 is mounted on a lower support member 4, a joining member 5 is applied to a predetermined position on the rear plate 81, and the supporting frame 86 is mounted on the applied joining member 5, and then a joining member 6 is applied to the top surface of the supporting frame 86. The joining member is also applied to the portion joined to the top surface of the supporting frame 86 of the face plate 82. In is used as the joining members according to this embodiment. Furthermore, the spacers 205 are placed at a predetermined position on the rear plate 81. And the members such as the supporting frame 86, spacers 205 and joining members 5, 6 are implemented in a seal bonding chamber (not shown) for manufacturing the envelope 90 so as to finish a preparatory process (step 2). In this case, the face plate 82 is held by arms 7 between the rear plate 81 having the supporting frame 86 and spacers 205 provided thereon and an upper support member 8 in the seal bonding chamber. The arms 7 function as separating means for warping the edge portions of the face plate 82 and separating it from the supporting frame 86.

Next, according to this embodiment, vacuum baking is performed on baking conditions of 400 degrees C. and 1 hour (step 3). These baking conditions are appropriately set up according to the use of the envelope 90 to be made. In this case, a clearance is provided between the mutually seal-bonded plates 81 and 82 by warping at least one of the two plates 81 and 82 to be convex to the other so as to sufficiently evacuate the space between the plates 81 and 82. According to this embodiment, as shown in FIG. 2B, corners of the face plate 82 are held by the arms 7 to warp the face plate 82 so that its underside opposed to the rear plate 81 becomes convex. In this case, the space between the plates 81 and 82 is sufficiently evacuated even in the vicinity of the center if there is a clearance of 1 mm or so between the plates 81 and 82 around their circumferences irrespective of whether or not the vicinity of the center of the warped face plate 82 is in contact with the spacers 205 then.

Thereafter, as shown in FIG. 2C, the arms 7 are lowered to place the face plate 82 on the supporting frame 86, and the seal bonding is performed at a temperature for melting the joining members 5 and 6 (step 4). According to this embodiment, the seal bonding process was performed on condition that the temperature of the plates 81 and 82 was within 160 degrees C.±5 degrees C.

Here, in the case where the envelope 90 to be made is a color image displaying apparatus, it is necessary to perform positioning of the plates 81 and 82 when lowering the arms 7 to place the face plate 82 on the supporting frame 86 as shown in FIG. 2C so that phosphors of colors of the phosphor film 84 correspond to the electron-emitting devices 87 on the plate 81. For that reason, according to this embodiment, mutual positioning of the plates 81 and 82 is sufficiently performed by using a positioning apparatus 200 (refer to FIG. 3) for performing the mutual positioning of the plates 81 and 82. The positioning apparatus 200 moves at least one of the plates 81 and 82 to the other so as to perform positioning in vertical and horizontal directions (XY directions) and a rotation direction (θ direction) in a plane of the plate. In the case of the configuration having no electron-emitting device or phosphor placed on the plates, the accuracy required of the positioning of the plates is not so high and so the positioning apparatus 200 described above is not always necessary.

On the seal bonding, a required degree of vacuum is $1 \times 10^{-6}$ [Torr] (approx. $1.3 \times 10^{-4}$ [Pa]) or less. Furthermore, there are the cases where a getter process is performed in order to maintain the degree of vacuum in the envelope 90 after the seal bonding. Here, the getter process is a process of, immediately before or after seal-bonding the envelope 90, heating the getter placed in advance at a predetermined position (not shown) in the envelope 90 by a heating method such as resistance heating or high-frequency heating so as to form an evaporated film (not shown). In this case, the major component of a getter member is ordinarily Ba or the like, and it is possible, by an absorptive action, of the evaporated film formed as described above, to maintain the degree of vacuum in the envelope 910 at $1 \times 10^{-5}$ to $1 \times 10^{-7}$ [Torr] (approx. $1.3 \times 10^{-3}$ to $1.3 \times 10^{-5}$ [Pa]) for instance.

Figure 4A:
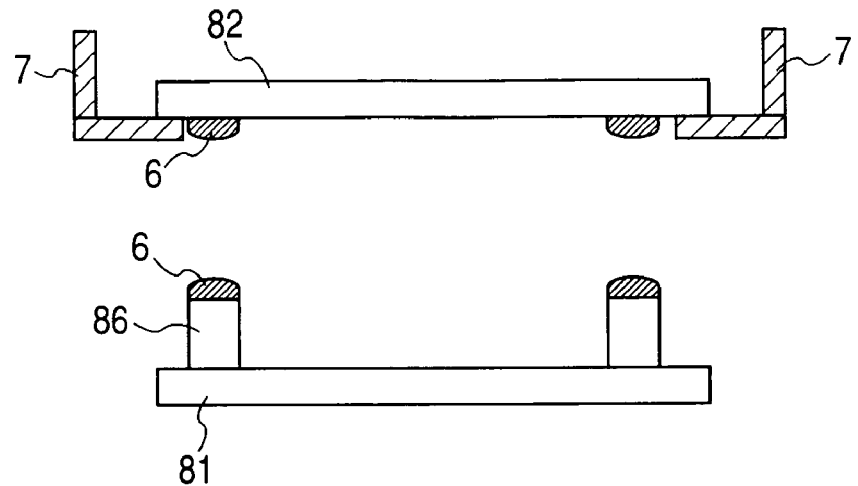
FIGS. 4A and 4B are diagrams showing a state in the process shown in FIG. 2B.
Figure 4B:
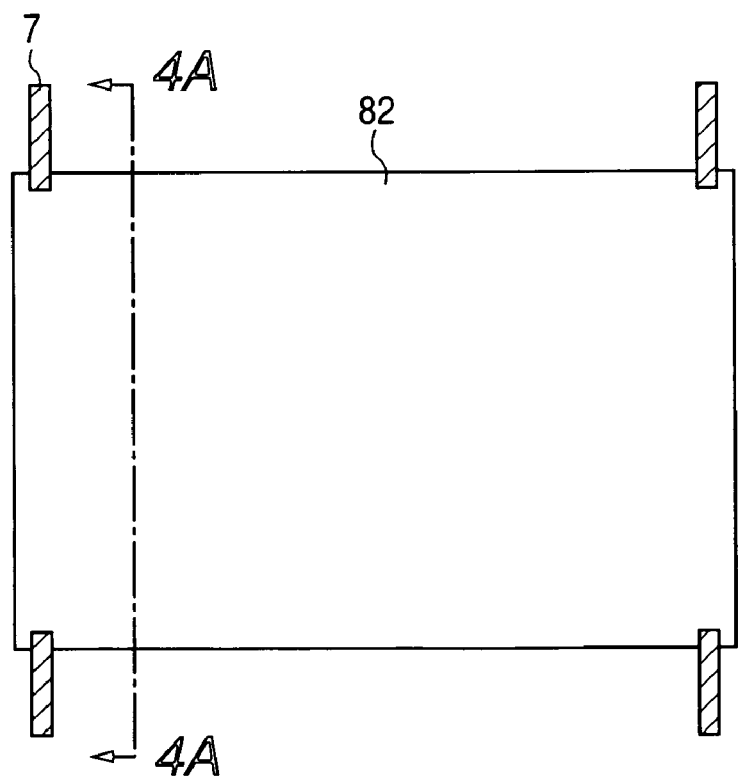

FIGS. 4A and 4B are diagrams showing a state in the process shown in FIG. 2B, where FIG. 4A is a sectional view thereof and FIG. 4B is a plan view viewing the face plate of FIG. 4A from above. FIG. 4B shows the arms 7 as partially seen through.

According to this embodiment, the face plate 82 is held by the four arms 7 at the four corners thereof to move the face plate 82 vertically while warping it. It is possible, in such a configuration, to keep warping the face plate 82 with its own weight so as to secure conductance between the two vacuum-sealed plates 81 and 82. Consequently, it is possible to seal-bond the plates 81 and 82 mutually in the state of having their internal space well evacuated. According to this embodiment, no particular control or apparatus is required other than the arms 7 for moving the face plate 82 vertically and the apparatus for driving them. Therefore, it is possible to reduce the cost of the apparatus for making the envelope 90.

The positions for the arms 7 to hold the face plate 82 are set up appropriately depending on the size and board thickness of the face plate 82. The positions for the arms 7 to hold the face plate 82 are not limited to the four locations at the four corners. It is also possible to have a configuration in which, while holding the face plate 82 with the arms 7 as if lifting it, a member for pushing the center of the face plate 82 downward is further provided separately. According to this configuration, it is possible to further warp the face plate 82 by pushing the center of the face plate 82 downward in the state of holding the four corners of the face plate 82 with the arms 7.

Figure 5A:
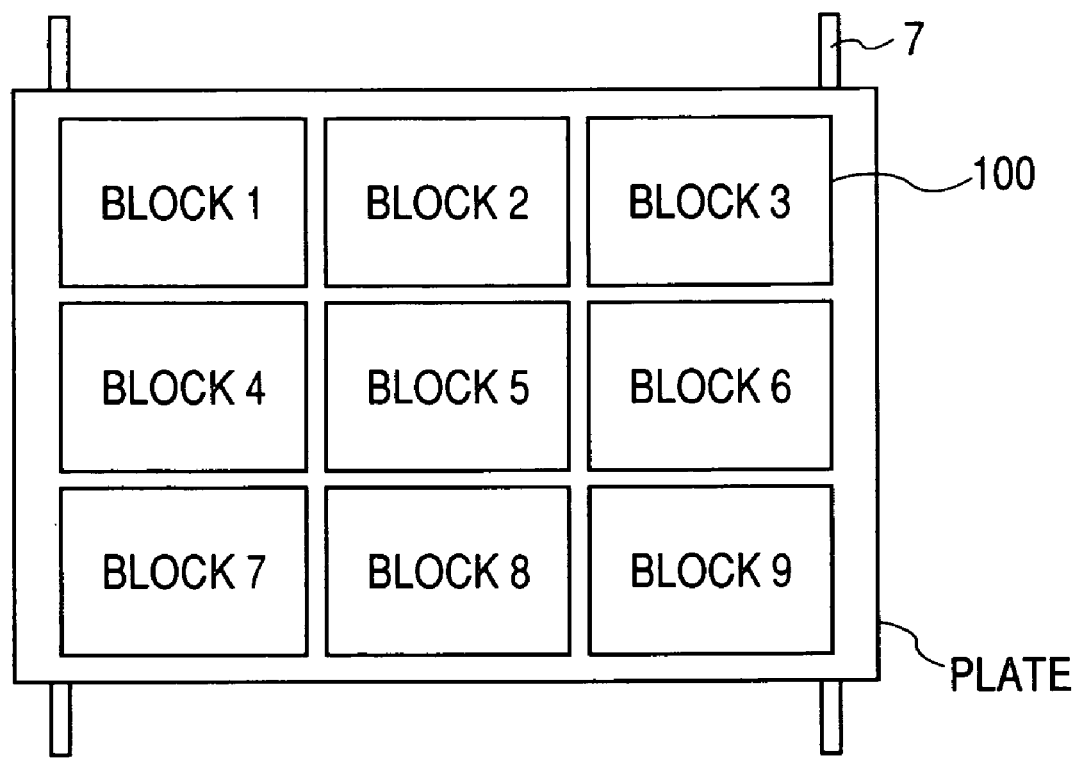
FIGS. 5A and 5B are diagrams showing a heating mechanism of a plate applied to the manufacturing method and a manufacturing apparatus of the image displaying apparatus according to an embodiment of the present invention.
Figure 5B:
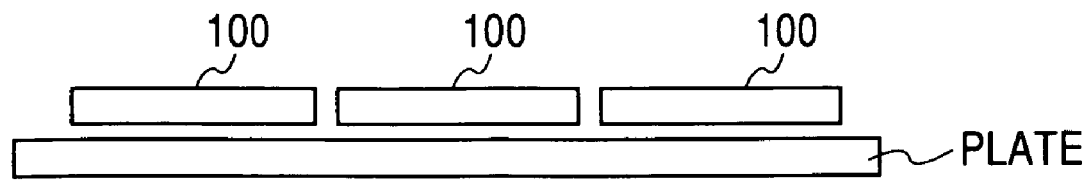

FIGS. 5A and 5B are diagrams showing a heating mechanism of the plate according to another embodiment of the manufacturing method and manufacturing apparatus of the image displaying apparatus of the present invention, where FIG. 5A is a plan view and FIG. 5A is a front view.

In the example shown in FIGS. 5A and 5B, heaters 100 for heating the face plate 82 are placed opposite one another on the plate by being divided vertically and horizontally into three blocks, that is, nine blocks in total. In the case where the face plate 82 consists of the above-mentioned glass substrate, the edge portions warp on heating the face plate 82 and so the gap is generated at the edge portions between the face plate 82 and the rear plate 81. For that reason, it is possible to evacuate the space between the plates 81 and 82 through the gap in the seal bonding process. Therefore, the heaters 100 function as separating means for warping the edge portions of the face plate 82 and separating it from the supporting frame 86.

The heaters 100 may be either set up to uniformly heat the face plate 82 or set up to provide temperature distribution to the face plate 82. In particular, it is effective, for the sake of warping the edge portions of the face plate 82, to heat the edge portions of the face plate 82 more strongly than the center thereof. Therefore, it is desirable to render heating by the heaters 100 of blocks 2, 5 and 8 for heating the edge portions of the face plate 82 stronger than the heating by the heaters for heating the center. According to this embodiment, the heaters 100 get heated to generate a temperature difference of 50 degrees C. at the maximum between the area of the block 5 as the center of the face plate 82 and the other areas in a vacuum baking process. However, the temperature difference becomes ±5 degrees C. or less before the seal bonding process.

This embodiment uses sheath heaters as the heaters 100. However, lamp heaters may be used instead of them. The above described the configuration in which the heaters 100 heat the face plate 82. It is also possible, however, to have the configuration in which the rear plate 81 is heated or both the plates 81 and 82 are heated by the heaters. It is also possible, as described above, to thus heat the plate with the heaters in combination with warping of the plate by holding at least the four corners of the plate with the arms.

Embodiments

Hereunder, the manufacturing method of the envelope of the present invention will be described in detail by taking up concrete embodiments.

First Embodiment

In this embodiment, the envelope was made by using a rear plate and a face plate both made of a blue plate glass of 900 mm×580 mm in length and breadth and 2.8 mm in thickness, spacers made of a blue plate glass of 1 mm×1 mm in length and breadth and 0.5 mm in thickness, and a supporting frame of 900 mm×580 mm in length and breadth with a surrounding wall of 4 mm in breadth and 0.2 mm in height (thickness). Raw glass substrates having no electron-emitting device, phosphor film or getter formed thereon were used for the rear plate and face plate respectively. The spacers were placed with 30-mm pitches. In was applied to the joining portions of the plates and the supporting frame.

The temperature during the vacuum baking process was 200 degrees C. During that time, the positions at 5 mm from the corners of the face plate as the upper plate were supported by the arms, and the face plate was lifted to the height of 3 mm from the top surfaces of the spacers placed on the rear plate to warp it so as to render its underside convex. After thus performing the baking for one hour, the envelope was made by seal-bonding the rear plate and face plate via the supporting frame.

Second Embodiment

To give a description of this embodiment by referring to FIGS. 1A to 1C, the envelope as an image displaying apparatus was made by using the rear plate 81 having an SiO$_2$ film of 3000 Å (300 nm) in thickness formed and electron-emitting devices and wirings further formed on the plate made of PD-200 (Asahi Glass Co., Ltd.) which is electric glass of 900 mm×580 mm in length and breadth and 2.8 mm in thickness, the face plate 82 having the phosphor film 84 and getter 9 formed on the plate made of PD-200 (Asahi Glass Co., Ltd.) which is electric glass of 900 mm×580 mm in length and breadth and 2.8 mm in thickness, the supporting frame 86 made of the blue plate glass of 830 mm×510 mm in length and breadth with a surrounding wall of 4 mm in breadth and 1.3 mm in thickness, and the spacers 205 having an antistatic film (not shown) formed on a surface of PD-200 (Asahi Glass Co., Ltd.) which is the electric glass of 780 mm in length and 200 μm in breadth and 1.6 mm in height. In was used as the joining member of the plates 81 and 82 and the supporting frame 86. The thickness of the joining member was 300 μm before the seal bonding and 150 μm after the seal bonding.

The temperature during the vacuum baking process was 400 degrees C. During that time, the positions at 5 mm from the corners of the face plate 82 as the upper plate were supported by the arms, and the face plate 82 was lifted to the height of 3 mm from the top surfaces of the spacers placed on the rear plate 81 to warp it so as to render its underside convex. After thus performing the baking for one hour, the envelope as the image displaying apparatus was made by seal-bonding the rear plate 81 and face plate 82 via the supporting frame 86.

Third Embodiment

In this embodiment, the center of the upper face plate 82 was heated by the heaters 100 in the vacuum baking process so that it becomes about 50 degrees C. higher than the other portions. In was applied only to the joining portions of the rear plate 81 and the supporting frame 86 (the frit glass was applied to the joining portions of the face plate 82 and the supporting frame 86). Otherwise, the envelope as the image displaying apparatus was made as in the case of the second embodiment.

Fourth Embodiment

In this embodiment, the centers of both the plates 81 and 82 were heated by the heaters in the vacuum baking process so that they become about 50 degrees C. higher than the other portions. Furthermore, the upper face plate 82 was lifted by the arms 7 to warp it and render its underside convex, and the lower rear plate 81 was warped by using an unshown mechanism to render its upper surface convex. Such a mechanism can be configured, for instance, by providing a pin (not shown) projectable to push the center of the rear plate 81 upward to the lower support member 4 shown in FIGS. 2A to 2C. In this case, such a pin functions as the separating means for warping the edge portions of the rear plate 81 and separating it from the supporting frame 86.

In was applied to the joining portions of the plates 81, 82 and the supporting frame 86. Otherwise, the envelope as the image displaying apparatus was made as in the case of the second embodiment.

Fifth Embodiment

Before putting it in the seal bonding chamber, this embodiment used a positioning spring (refer to FIGS. 6A and 6B) capable of moving the two plates 81, 82 only heightwise (in a superposing direction) so as to fix their mutual positions.

Figure 6A:
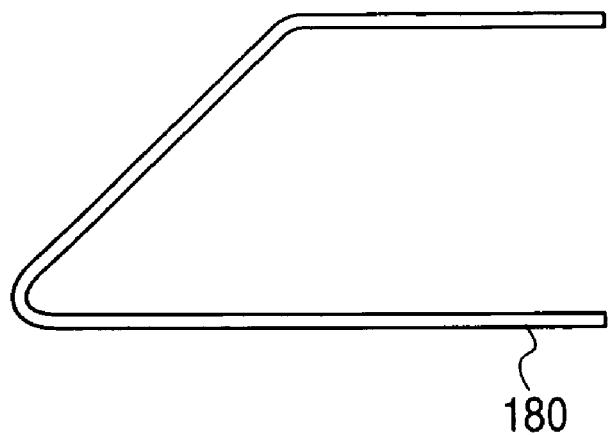
FIGS. 6A and 6B are diagrams showing a positioning spring for positioning and fixing two plates.
Figure 6B:
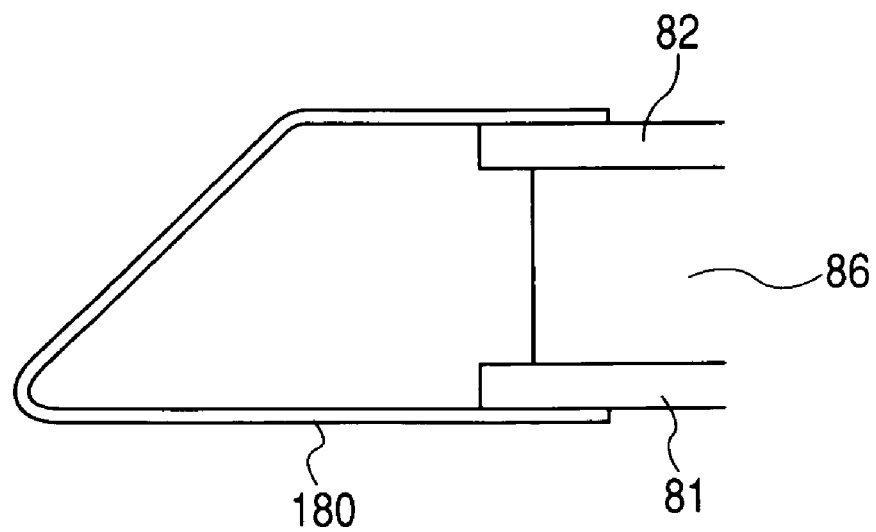

FIGS. 6A and 6B are diagrams showing the positioning spring for positioning and fixing the two plates. As shown in FIGS. 6A and 6B, a positioning spring 180 is in a clip-like form, and is formed to be able to sandwich the plates 81, 82 joined to the top and under surfaces of the supporting frame 86.

The plates 81, 82 are mutually aligned by the positioning apparatus 200 shown in FIG. 3, and are mutually positioned thereafter, for instance, by mounting two positioning springs 180 on one side of the plates 81, 82 as shown in FIG. 6B. To keep that positioning state, a cementing material such as Aron Ceramics of Toagosei Co., Ltd. is applied to the contacting portions of the positioning springs 180 and the plates 81, 82, and is hardened and fixed at 120 degrees C. The positioning springs 180 are built into a product in the state of thus being fixed on the plates 81, 82, and so they should desirably have the same thermal expansion coefficient as the plates 81, 82. For that reason, according to this embodiment, the positioning spring 180 is configured by a nickel alloy having the same thermal expansion coefficient as PD-200 (Asahi Glass Co., Ltd.) which is the material of the plates 81 and 82.

Otherwise, the envelope as the image displaying apparatus was made as in the case of the second embodiment.

Sixth Embodiment

Before putting it in the seal bonding chamber, this embodiment used a positioning spring (refer to FIGS. 6A and 6B) capable of moving the two plates 81, 82 only heightwise (in the superposing direction) so as to fix their mutual positions. And in the vacuum baking process, the face plate 82 was warped while holding the face plate 82 above and apart from the rear plate 81 not to be in contact with the spacers 205 on the rear plate 81. Thereafter, the envelope as the image displaying apparatus was made as in the case of the second embodiment.

Seventh Embodiment

Before putting it in the seal bonding chamber, this embodiment prepared seven sets of the two plates 81, 82 having their mutual positions fixed with the positioning spring (refer to FIGS. 6A and 6B) capable of moving them only heightwise (in the superposing direction). And the seven sets were collectively seal-bonded by a batch processing apparatus capable of simultaneously putting them therein. Otherwise, the envelope as the image displaying apparatus was made as in the case of the fifth embodiment.

This application claims priority from Japanese Patent Application No. 2004-243622 filed Aug. 24, 2004, which is hereby incorporated by reference herein.

What is claimed is:

1. A method of manufacturing an image displaying apparatus comprising hermetically sealed first and second substrates, the first substrate being a square shape on which one of an electron-emitting device and a phosphor film is placed and the second substrate being a square shape on which the other of the electron-emitting device and the phosphor film is placed, the method comprising the steps of:
- (A) aligning, within a chamber, the first and second substrates opposite to each other, by locating the first substrate above a supporting frame provided at a periphery of the second substrate, the supporting frame having a joining member at a top thereof and the second substrate having a plurality of spacers inside the supporting frame;
- (B) lifting four corners at a periphery of the first substrate away from the supporting frame of the second substrate by arms which engage with the four corners so that the first substrate warps due to its own weight and is convex with respect to the second substrate;
- (C) while sustaining the lifting of the four corners by the arms, exhausting the inside of the chamber after the first substrate is formed into the convex shape, until a degree of vacuum for a gap space between the first and second substrates becomes $1 \times 10^{-6}$ [Torr] or less; and
- (D) after the exhausting step [C], lowering the arms downwardly so that the four corners of the first substrate are mounted on the supporting frame and the warping of the first substrate is released, and then hermetically sealing peripheries of the unwarped first substrate and the second substrate with the joining member to form the hermetically sealed first and second substrates, within the chamber.

2. The method of manufacturing an image display apparatus according to claim 1, wherein the separation is performed by heating the first substrate so that a temperature at the edge portion of the first substrate is higher than a temperature at the center portion of the first substrate by using a first heater for heating the edge portion of the first substrate and a second heater for heating the center portion of the first substrate, the first and second heaters being provided opposed to the first substrate on a side opposite from the second substrate.

3. The method of manufacturing an image display apparatus according to claim 1, further comprising a getter processing step of heating a getter placed within the image display apparatus.

4. The method of manufacturing an image display apparatus according to claim 3, wherein the getter processing step is performed after the first and second substrates are hermetically sealed.

5. The method of manufacturing an image display apparatus according to claim 1, wherein the warping of the first substrate includes a step of heating the first substrate.

6. The method of manufacturing an image display apparatus according to claim 1, wherein the warping of the first substrate includes a step of heating the first substrate, such that a temperature at an edge portion of the first substrate is higher than a temperature at a center portion of the first substrate.

* * * * *